Sept. 10, 1940. P. M. BOURDON 2,214,319
WHEEL
Filed Feb. 25, 1937 3 Sheets-Sheet 2
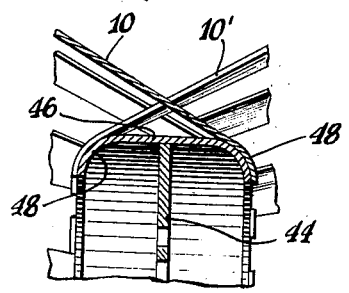
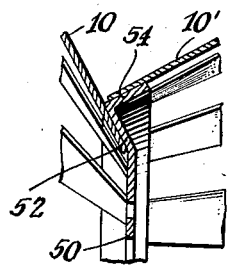
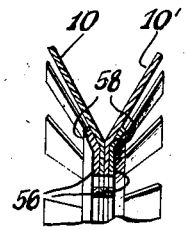
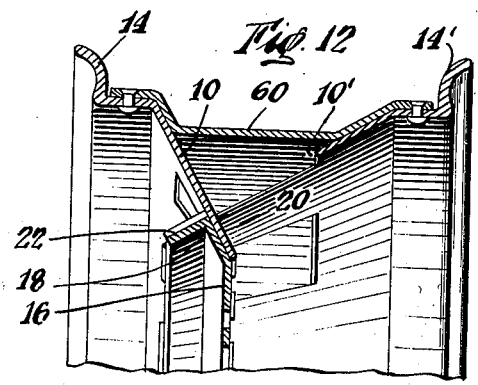
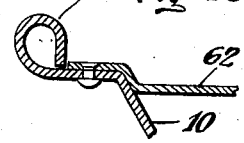
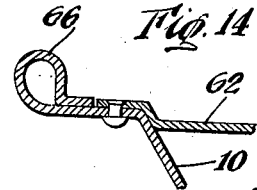
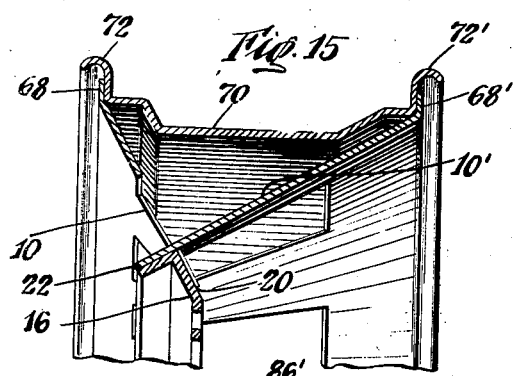
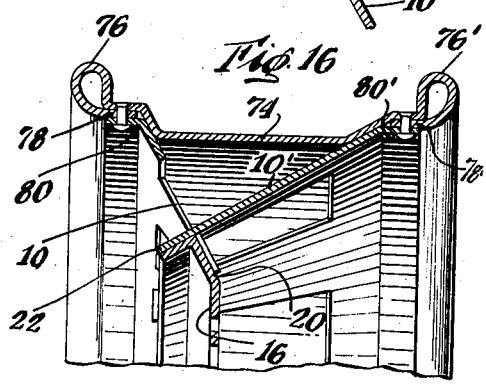
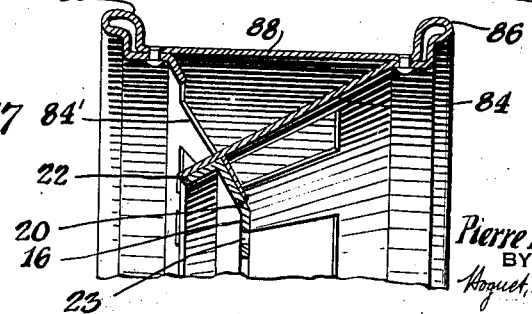
INVENTOR
Pierre Marcel Bourdon
BY
Hoguet, Neary & Campbell
ATTORNEYS

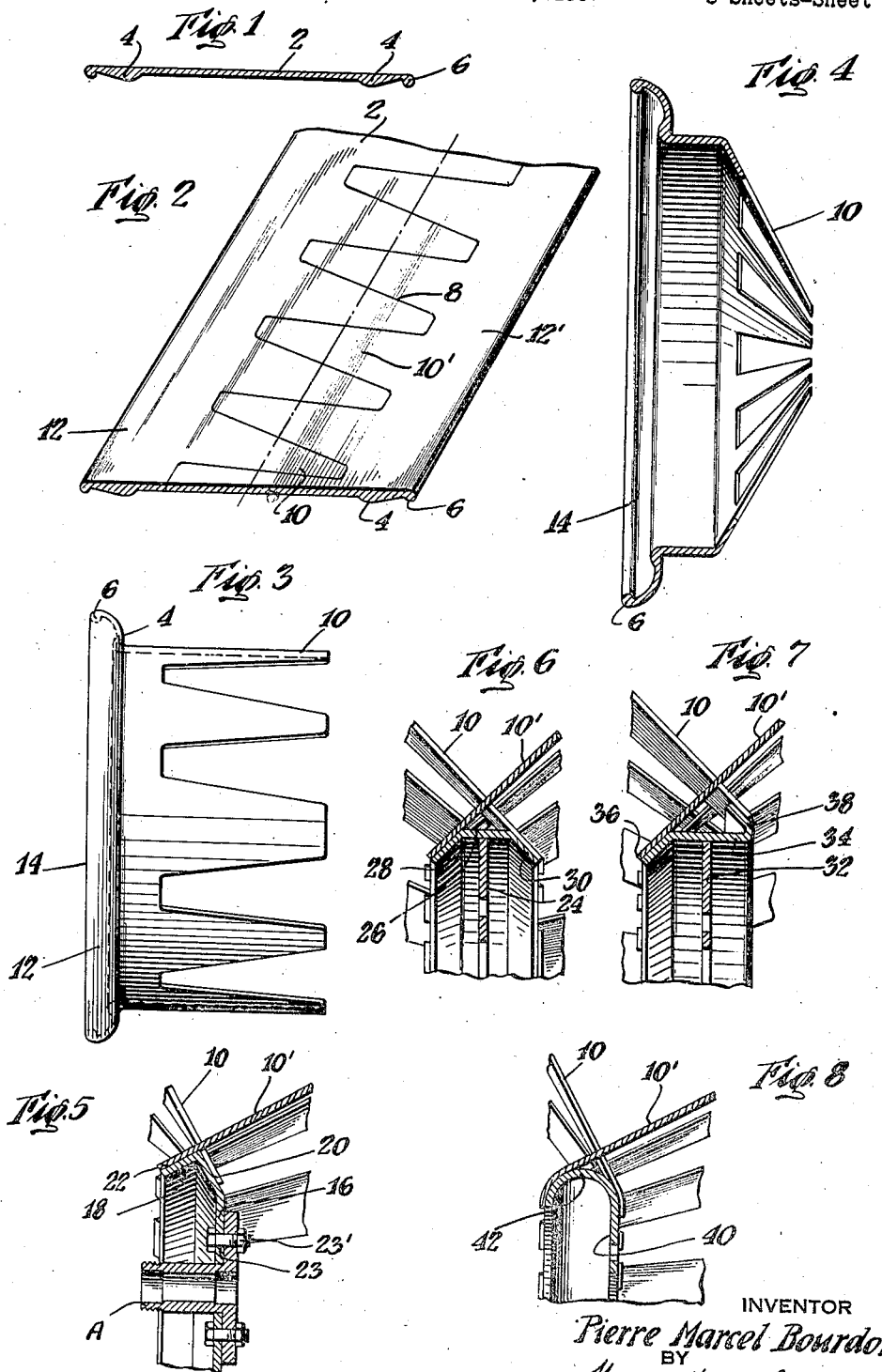

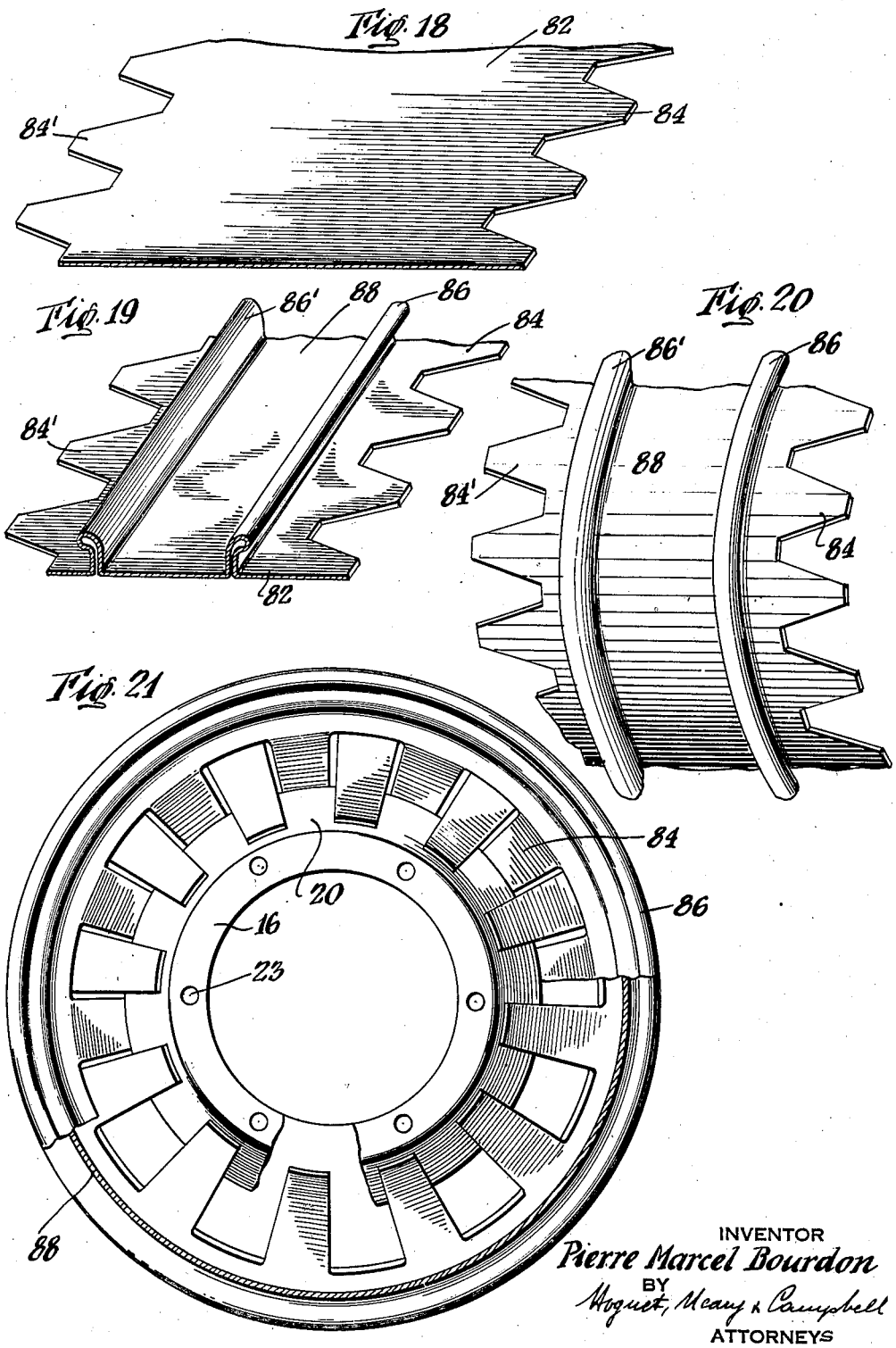

Patented Sept. 10, 1940

2,214,319

UNITED STATES PATENT OFFICE 2,214,319

WHEEL

Pierre Marcel Bourdon, Paris, France, assignor to Michelin et Cie., Clermont-Ferrand, France, a corporation of France Application February 25, 1937, Serial No. 127,615
In France February 29, 1936

5 Claims. (Cl. 301—64)

This invention relates to metallic wheels for vehicles for receiving inflatable pneumatic tires and more particularly to the production of a very light but strong wheel construction which can be suitably manufactured with a minimum waste of material.

Metal wheels are well known and many different types have been developed in the past. Commonly used forms of such metal wheels are the disk type and the stamped spoke type. Usually these wheels consist of a single disk or a single row of spokes connected to and supporting one peripheral edge of a rim. These either possess mechanical weaknesses or require excessive weight to overcome these weaknesses.

Another form of wheel consists of a rim member attached to the large bases of generally frusto-conical disks; the smaller bases of the disks being attached to a hub or element detachably connected to the hub forming a generally triangular support, in section, for the rim, with the apex of the triangle at the hub element. No supporting means projects from the hub element along the conical surface of the disks and consequently the apex forms a point of weakness in the wheel which allows it to be bent and thrown out of alignment. To overcome this weakness, the disks must be made of heavier metal to provide sufficient strength to prevent bending of the wheel, thereby greatly increasing the weight of the wheel and the unsprung weight of the vehicle.

An object of the present invention is to produce strong, lightweight metal wheels having spokes or rim-supporting elements attached to a hub or other supporting structure in a manner resulting in great strength and resistance to breakage or bending of the elements of the wheel.

A further object of the invention is to produce a metal wheel having a triangulation of the spokes in which the spokes are so angularly inclined and related to the periphery of a hub or other supporting portions that the lateral and vertical stresses are carried largely longitudinally of the spokes.

The objects of the invention have been achieved by the production and use of cooperating wheel elements of similar nature in which the rim forming or supporting elements are integrally connected with the spokes of the wheel and the spokes are arranged in such a manner that they lie substantially in or form the surface of truncated cones, the large bases of the truncated cones forming lateral peripheral edges of the rim concentric with the hub portion and the inner ends of the spokes being concentric with the hub and of such an inclination that the generatrices of the frusto-conical surfaces intersect on the axis of the hub. Two such truncated cone members may be suitably used for forming the completed wheel, the spokes of each of the elements preferably being arranged to intersect each other in the plane of the hub member to which they are attached.

The angles of inclination of the surfaces formed by the spokes may be the same or they may be different, depending upon whether it is desired to produce a symmetrical construction with relation to the hub, or to have the rim portion offset slightly to one side of the hub. In either event, the construction may be varied to suitably produce the desired relationship between the hub and the rim portion. The inner ends of the spokes may be independently attached in any suitable manner to conical or frusto-conical elements carried by the hub or member attachable to a hub without bending the spokes between the rim and the zones of attachment whereby the spokes are reinforced by the hub or element attachable to the hub. The conical or frusto-conical surfaces of the hub element are fixed to the straight portion of the wheel elements adjacent the apex of the triangular support for the rim formed by the spokes, and extend beyond the apex of the triangle thereby greatly strengthening the zone of intersection of the spokes. Additionally, the angle of inclination of the spokes is preferably such that almost all the stresses exerted on the rim are transmitted longitudinally of the spokes in a straight line to the hub element, thereby avoiding the application of lateral stresses to any unsupported portion of the spokes. The resistance to tensile stresses is far in excess of the resistance to lateral stresses in thin metal so that in my novel construction the wheels may be constructed with the spokes of only sufficient thickness and weight to resist the tensile stresses encountered during service. The spoke may therefore be constructed of much thinner metal than heretofore found possible and as a result the wheels are much lighter in weight.

The elements forming the rim and spoke portions may be suitably produced in a number of ways but they may be constructed advantageously from a single strip of metal by cutting along the metal in a sinusoidal curve to produce a plurality of elements which ultimately form the spoke portions of the completed wheel. By cutting the metal along the single curve, no metal is wasted in the production of the spoke elements of the wheel.

For a better understanding of the invention, reference may be had to the accompanying drawings, in which:

Figure 1 is an end view of a strip of metal suitable for use in the production of wheels in accordance with my invention;

Figure 2 is a perspective view of a strip of metal disclosing one manner in which a strip may be severed to form the element of the wheel;

Figure 3 is a side view of a wheel element in one stage of construction;

Figure 4 is a sectional view of completed element of one form of wheel;

Figure 5 is a sectional view partly broken away of one form of hub and a manner of attachment of the spokes to the same;

Figures 6, 7, 8, 9, 10 and 11 are sectional views, partly broken away, of modified hub elements disclosing details of the manner in which the spokes may be attached to the hubs;

Figure 12 is a vertical sectional view of a portion of a typical wheel construction disclosing details of one form of rim and hub construction of the present invention;

Figures 13 and 14 are fragmentary sectional views of modified forms of rim construction;

Figures 15, 16 and 17 are vertical sections of portions of wheels made in accordance with my invention, disclosing further modifications of the rim construction;

Figure 18 is a perspective view of another form of strip member having spokes cut therein;

Figure 19 is a perspective view of wheel construction in partially completed form;

Figure 20 is a perspective view of the strip disclosed in Figures 18 and 19 in a further stage of construction; and Figure 21 is a side view of the completed wheel.

Illustrative of one form of blank member which may be suitably processed to produce one form of wheel construction, Figures 1 and 2 disclose a metallic strip 2 having thickened portions or longitudinally extending ribs 4 adjacent each edge thereof, and beaded lateral edges 6. Wheel elements may be suitably formed from the strip member 2 with a minimum waste of material by cutting the blank in any suitable manner to form corresponding spoke and rim elements such as by severing on a sinusoidal or similar line 8. By severing in this manner spoke portions 10 and 10' and rim forming or supporting portions 12 and 12' may be readily produced. The flat strips having the projecting spokes 10 and edges 12 may then be bent around a suitable mandril to produce a substantially cylindrical member having a castellated edge formed by the spokes 10. The rim portions 12 and 12' may then be suitably formed, as best shown in Figure 3, to produce a tire supporting bead 14 at the edge of the cylindrical member. The thickened portion 4 of the starting blank allows the production of a bead member 14 of the desired shape, size and thickness as best shown in Figure 4, the spoke portions 10 may then be bent inwardly to lie in the surface of or to form a substantially truncated cone structure, thus producing one-half of the spoke and bead portions of the completed wheel.

A cooperating element similar to that disclosed in Figure 4 may be produced to form the other side of the completed wheel and this element may have the spokes 10' formed to lie in the surface of or form a truncated cone of the same or different inclination. As illustrated in Figure 5, the spokes 10 and 10' may be attached to a suitable hub member or element attachable to a hub member consisting of a generally annularly shaped ring member 16 having a flange 18 on its outer edge consisting of substantially right-angularly related frusto-conical surfaces 20 and 22. The angle of inclination of the surfaces 20 and 22 with relation to the annular ring 16 may be varied. Also, as illustrated in Figure 5, they may be arranged at different angles so that the completed wheel member will be offset slightly with respect to the hub. The two bead and spoke elements having the spokes 10 and 10' arranged at different angles to the rim may be attached by any suitable means such as welding or riveting to the walls 20 and 22 of the hub member 16. This construction avoids bending of the spokes 10 and 10' so that the stresses exerted on the spokes will be carried longitudinally thereof and transmitted along a straight line to the hub, thus greatly increasing the strength of the wheel as a whole, particularly since the rim and the spokes form a triangular construction of great strength.

The ring 16 may be provided with openings 23 for receiving bolts 23' to attach the wheel to a hub A or, if desired, may be formed integrally with the hub A.

Figure 6 illustrates another form of hub member to be used with rim and spoke elements 10 and 10' having the same relative inclination, that is, forming a wheel in which the center of the completed rim is in alignment with the center of the hub or ring member 24 attachable to a hub. At its outer edge is provided a ring member consisting of a central portion 26 perpendicular to the ring 24 and having inclined edges 28 and 30 forming truncated cones to which the spokes 10 and 10' of complementary spoke and rim members may be attached by welding or riveting.

Figure 7 discloses a further form of member attachable to a hub consisting of an annular ring 32 to which is attached in any suitable manner a ring member consisting of a central cylindrical portion 34 having at one edge a frusto-conical flange 36 extending toward the axis of the ring member 32 and an oppositely directed flange 38, also of frusto-conical shape projecting outwardly from the cylindrical rim 34. The spokes 10' and 10 of the wheel elements in this modification may be attached to the flanges 36 and 38 by means of welding or riveting.

In Figure 8 is disclosed a further form of hub member consisting of an anular ring 40 having a curved flange 42 at its outer edge to the opposite sides of which may be attached by welding or riveting the spokes 10 and 10' of the wheel forming elements.

Figure 9 discloses a still further form of hub element consisting of an annular ring 44 carrying at its outer edge a ring member 46 having curved edges 48 to which the spokes 10 and 10' of the wheel elements may be attached by welding or other suitable means.

Figure 10 discloses a still further form of hub member consisting of an annular ring 50 having at its outer edge a flange formed of two angularly related surfaces 52 and 54 forming a continuation of the ring 50 to which the spokes 10 and 10' of the wheel elements may be directly attached.

Figure 11 discloses a still further form of wheel mounting and spoke supporting hub member consisting of a pair of ring members 56 having outwardly flared flanged portions 58 on their peripheries and between which may be mounted and fixed by riveting or welding the spokes 10 and 10' of the wheels.

The tire supporting rim for the wheel may be formed in many different ways and may consist of a portion formed integrally with the spokes or a supplementary element connecting the bead portions 14 and 14' of two wheel elements to strengthen and rigidify the wheel assembly and form a suitable rim surface for receiving the tire. As illustrated in Figure 12, the wheel supporting surface for use with the type of wheel elements disclosed in Figure 4 may suitably consist of an annular ring 60 bridging the space between the bead elements 14 and 14' and being connected thereto by welding or riveting as may be desired. In this type of construction the rim forming member 60 and the spoke and bead forming elements may be made of metals of different weight or thickness in order to produce the lightest possible construction commensurate with the weight or stresses to which it may be subjected.

In Figures 13 and 14 is illustrated a further form of rim member 62 which may be suitably associated with rolled beads 64 or 66 formed on the edges of the wheel elements. The beads 64 or 66 may be rolled at the edge of a flat sheet of material from which the wheel is made without requiring the use of thickened portions such as the portions 4 of the strip 2 disclosed in Figures 1 and 2.

In Figure 15 is disclosed a still further form of rim and bead construction associated with and attached in any desired manner to wheel elements consisting of substantially truncated cone formations and having laterally extending rims 68 and 68' forming the bases of the truncated cones formed by spokes 10 and 10'. The rim forming element in this construction includes a band 70 of suitable width to fit between the rims 68 and 68', having outwardly projecting beads 72 and 72' thereon formed integrally with the band 70. The rim and bead forming element 70, 72 and 72' may be suitably attached to the rims 68 and 68', by riveting or welding to form the desired triangular section wheel construction.

Figure 16 discloses a somewhat similar construction as Figure 15, in which the rim and bead forming construction are integral and may consist of an annular band 74 having beads 76 and 76' consisting of outwardly projecting rolled edges provided with in-turned flanges 78 and 78' lying against the inner surface of the band 74. This rim and bead member 74, 76 and 76' may be attached to wheel elements consisting of spokes 10 and 10' forming truncated cones ending in cylindrical extensions 80 and 80' to which the rim forming member may be fixed by welding or riveting.

If desired the wheel construction consisting of spokes, beads and rim may be made from a single sheet of metal, each of the elements being formed in a successive series of steps to produce a completed construction which may be attached to the hub or a hub member. For example, as shown in Figure 18, a strip of material 82 of the desired width may be severed along each of its edges to form staggered spoke members 84 and 84' on opposite sides of the same. It will be understood that a plurality of the blanks 82 having spoke members 84 and 84' may be severed from a single wide sheet of material to form a plurality of such elements without waste of material. Suitable bead portions 86 and 86' may be formed on the blank 82 as disclosed in Figure 19 by stamping or bending, said bead forming portions 86 and 86' defining the rim 88 and the sides of the periphery of the completed wheel. The strip 82 with beads 86 and 86' formed thereon may then be bent into the form of a cylinder, as best shown in Figure 20; and the ends of the bent strip connected by welding or riveting. The spoke members 84 and 84' may then be bent inwardly toward the center of the cylinder to cause spokes from opposite sides to intersect, as best shown in Figures 17 and 21, after which they may be attached to a suitable detachable hub element, such as 16, by welding or riveting.

It will be understood from the foregoing descriptions of the forms of wheels embodying my invention that I am able to produce a lightweight wheel of great strength, that is, having the most satisfactory form of bracing, such as triangulation, to produce the greatest rigidity with the least possible weight. It will be understood that, in the wheels formed of a plurality of elements, the thickness of the material used in the construction of the wheel may be varied in different parts of the same, depending upon the stresses to which each of the elements may be subjected, thereby allowing a substantial decrease in the weight of the completed wheel. The wheel may also take different forms and elements of the same may be varied in shape in order to cooperate with different types of tires and to be used on different types of vehicles such as those having one or more tires. Therefore, the embodiments of the invention should be considered as illustrative only and not as limiting the scope of the following claims.

I claim:

1. In a metallic wheel for vehicles, the combination of an annular rim band, a series of straight spoke elements joined by an annular flange at the outer ends thereof connected to one lateral edge of said band, another series of straight spoke elements joined by an annular flange at the outer ends thereof connected to the other lateral edge of the band and being staggered with respect to said one series of spoke elements, both series converging toward each other with the inner ends of the spoke elements of one series passing between the spoke elements of the other series, and an element attachable to a hub having a flange thereon formed with relatively inclined intersecting surfaces complementary to the inclination of and fixedly connected to the inner ends of said spokes.

2. In a metallic wheel for vehicles, the combination of a rim, a central element attachable to a hub, an annular member attached adjacent to one peripheral edge of said rim having a series of straight spoke elements directed inwardly therefrom to form a truncated cone, another annular member attached adjacent to the other peripheral edge of said rim and having a series of straight spoke elements thereon directed inwardly to form a truncated cone, one series of spoke elements passing between the spoke elements of the other series in staggered relationship, and angularly related flanges on said element, inclined complementally and connected to the inner portions of both series of said spoke elements closely adjacent the zone of intersection of the spoke elements.

3. In a light metallic wheel for vehicles, the combination of an annular rim having two spaced peripheral bead flanges engageable with a tire, a central element having converging frusto-conical flanges thereon, an annular member having a series of straight spoke elements directed inwardly from adjacent said one bead flange to form a truncated cone, another annular member having a series of straight spoke elements directed inwardly from adjacent said other bead flange to form a truncated cone, one series of spoke elements passing between the spoke elements of said other series in staggered relationship and each series of spoke elements being inclined complementally and having its inner end portions connected to a different one of said frusto-conical flanges closely adjacent the zone of intersection of said spoke elements.

4. In a metallic wheel for vehicles, the combination of an annular rim band, a central element attachable to a hub, an annular member attached adjacent to one peripheral edge of said band having a series of straight spoke elements directed inwardly therefrom to form a truncated cone and a bead flange extending radially beyond said band, another annular member attached adjacent to the other peripheral edge of said band and having a series of straight spoke elements thereon directed inwardly to form a truncated cone and a bead flange extending radially beyond said band, one series of spoke elements passing between the spoke elements of the other series in staggered relationship, and angularly related flanges on said central element inclined complementally and connected to the inner portions of both series of said spoke elements closely adjacent the zone of intersection of said spoke elements.

5. In a metallic wheel for vehicles the combination of an annular rim band, a central element attachable to a hub, an annular member attached adjacent to one peripheral edge of said rim having a rolled bead flange extending radially beyond said band and a series of straight spoke elements directed inwardly to form a truncated cone, another annular member attached adjacent to the other peripheral edge of said band having a rolled bead flange extending radially beyond said band and a series of straight spoke elements directed inwardly to form a truncated cone, one series of said spoke elements passing between the spoke elements of the other series in staggered relationship, and angularly related flanges on said element inclined complementally and connected to the inner portions of both series of said spoke elements closely adjacent the zone of intersection of said spoke elements.

PIERRE MARCEL BOURDON.